Figure 1:
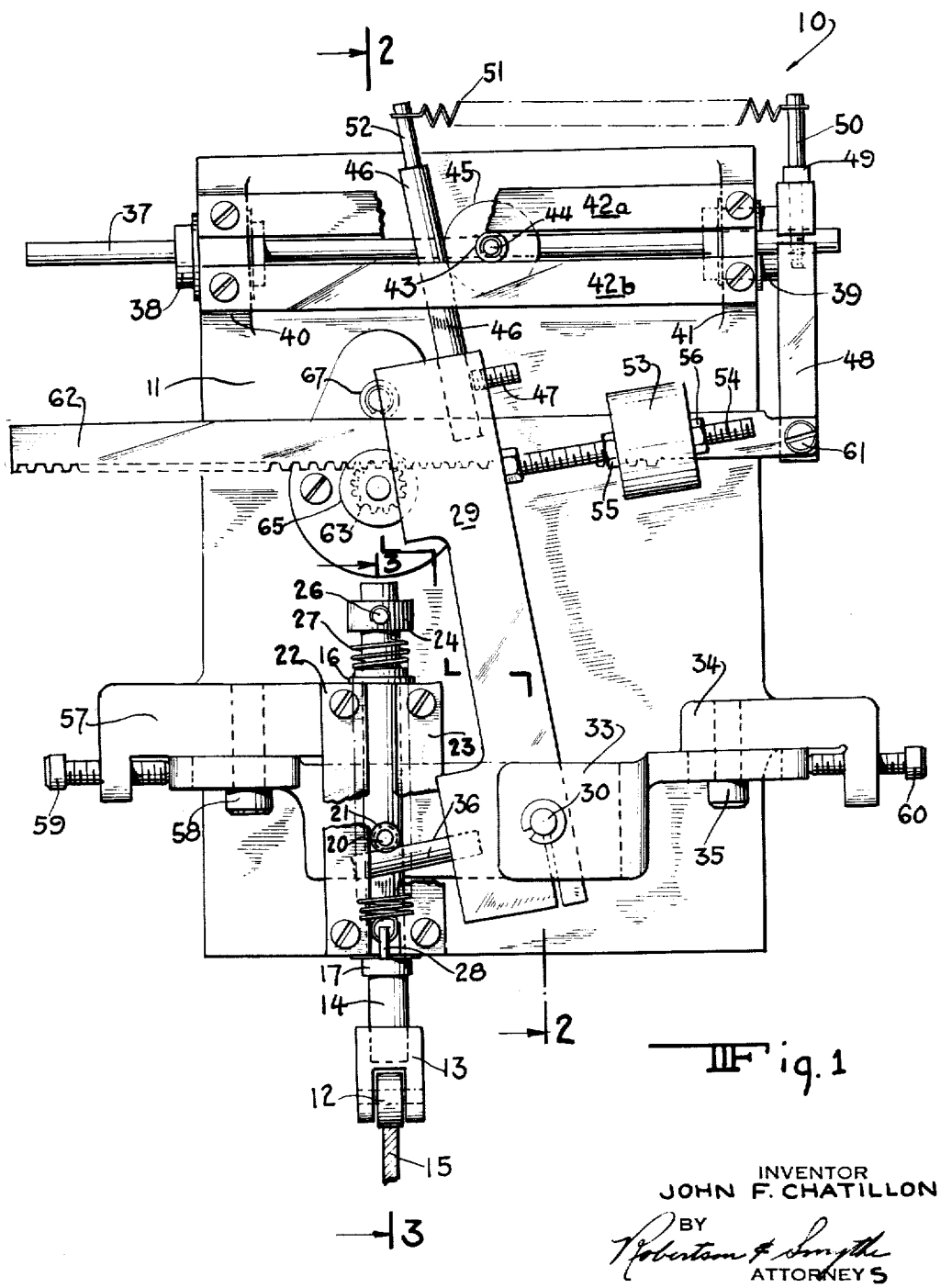

March 19, 1963   J. F. CHATILLON   3,081,640
MOVEMENT MULTIPLYING MECHANISM

Filed June 21, 1960   2 Sheets-Sheet 1

INVENTOR
JOHN F. CHATILLON
BY
Robertson & Smythe
ATTORNEYS

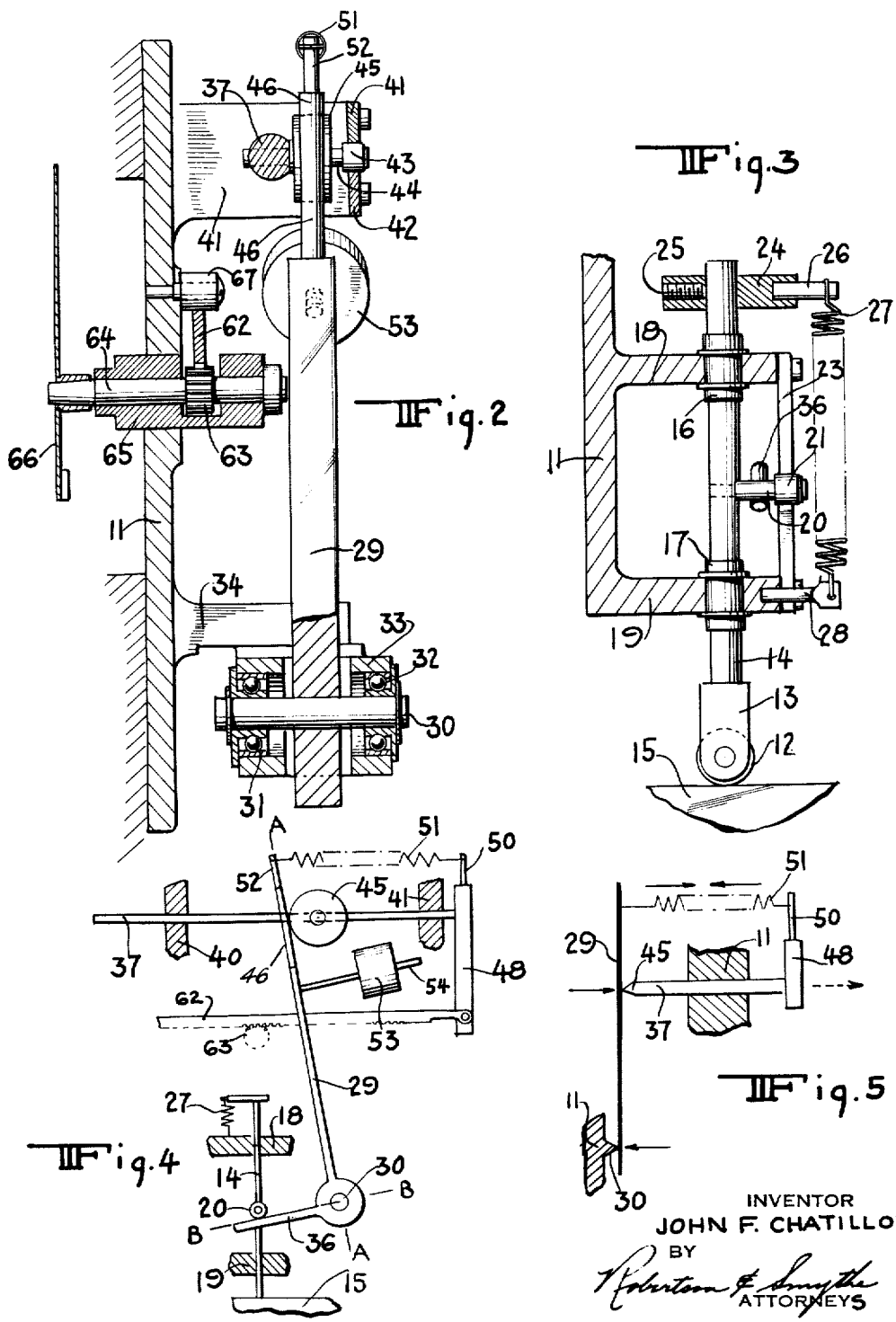

United States Patent Office 3,081,640
Patented Mar. 19, 1963

3,081,640
MOVEMENT MULTIPLYING MECHANISM
John F. Chatillon, New Canaan, Conn., assignor to John Chatillon & Sons, New York, N.Y., a corporation of New York
Filed June 21, 1960, Ser. No. 37,734
11 Claims. (Cl. 74—110)

This invention relates to a movement for converting an input motion to an output motion which is a predetermined multiple of the input motion.

In mechanical measuring devices, it is customary to employ a movement to transmit and multiply the motion of the sensing element of the device in order to obtain a useful indication of the quantity being measured. To obtain good measuring accuracy, it is essential that the movement transmit and multiply the input motion in a precise manner without loss motion and without introducing fluctuations and error motions.

In many cases the motion of the sensing element in response to physical changes to which it is responsive is of a very low order of magnitude. Consequently the movement must furnish appreciable multiplication of the small input motion. An attempt to obtain sufficient multiplication by gearing can introduce the difficulties of backlash, gear tooth wear, and the expense and difficulty of producing precision gears.

To multiply the input motion, simple and compound lever systems of the type employing knife edges have been used. The knife edges transmit the motion to and from the lever or levers. Knife edges are inherently fragile, difficult to make and subject to rapid wear. Even with these difficulties, knife edges are used in lever systems since they insure that the line of contact of the knife edge is always in a plane spaced at a known distance from the fulcrum regardless of the positioning of the lever about the fulcrum. Of course, if the knife edge dulls, a radius is formed and then the line of contact varies for different positions of the lever, with the result that errors are introduced.

According to my invention, a pivotally mounted lever having lever arms extending from the pivot point is employed. Input and output rod members which are movable in a rectilinear manner transmit the motion to and from the lever system respectively. Each of the lever arms has a surface portion disposed in a plane containing the axis of the lever pivotal attachment when that surface portion is substantially at right angles to the line of motion of the rod adjacent to that surface portion. Means are provided for coupling each rod to the lever. The couplings have a portion contacting the rods. In addition, the couplings have a circular portion contacting the surface portion of the lever. The radii of the circular portion of each coupling are related to one another as the distances of their respective lever arms from the pivotal attachment to the point of contact on said surface portion are related, when both of said surfaces are positioned substantially at right angles to the line of motion of the rods adjacent thereto.

With this arrangement, as the lever moves the point of contact of each coupling on the lever moves in a related manner so that the basic relationship of output movement for a given input movement remains constant for all positions of the lever. Proportioning the radii of the coupling means in the same ratio as that of their respective lever arms is the basis of maintaining the constant multiplication factor for the lever system.

In another embodiment of the invention, means are provided for biasing each of the lever arms in opposite directions to insure that the coupling means will always be in contact with surface portions of the lever arms. To accomplish this, spring means disposed between one rod and the base of the movement result in one lever arm being biased in a predetermined direction. At the same time, an additional spring means disposed between the other lever arm and its adjacent rod serves to bias that arm in a direction opposite to the predetermined one of said one lever arm.

With reference to the accompanying drawings, I shall now describe the best mode contemplated by me for carrying out my invention.

FIG. 1 is a front elevational view of the movement.
FIG. 2 is a sectional view taken along the line 2—2 of FIG. 1 and showing the supports for the lever and pinion.
FIG. 3 is a sectional view taken along the line 3—3 of FIG. 1 showing the input rod.
FIG. 4 is a schematic representation of the linkage of the movement.
FIG. 5 is a schematic representation of the spring which urges the lever against the disc of the output rod.

Movement 10 includes base 11 upon which the various parts are mounted. The input motion to the movement is transmitted through roller 12 mounted in roller support 13 which is attached to input rod 14 (FIG. 1). The input movement may originate in any mechanical system and is delivered to roller 12 through link 15. In the case of weighing scales or similar devices, link 15 may actually be the sensing unit of the scale, such as a calibrated C-spring. Under load the spring deflects in a manner in which its deflection is a direct function of the applied load. For such a case, precise measurement of the deflection is required in order to indicate the magnitude of the load. Since the deflections of the calibrated C-spring are of a low magnitude, it is necessary for the movement to magnify these deflections in order to furnish a usable scale for the spring equipment.

Input rod 14 is mounted for rectilinear motion by means of sleeves 16 and 17 which are mounted in supports 18 and 19 extending from base 11 (FIG. 3). Extending from input rod 14 is pin 20 upon the end portion of which is mounted bearing 21. Slides 22 and 23 mounted upon supports 18 and 19 are spaced apart to receive bearing 21 therebetween so as to guide input rod 14 and prevent it from rotating about its own axis.

The end portion of input rod 14 opposite to the location of roller 12 is provided with support 24 which is retained in place by set screw 25. Extending from support 24 is eye member 26 to which is attached tension spring 27. At its opposite end tension spring 27 is attached to eye member 28 extending from support 19. The tension spring serves to bias input rod 14 in a downward direction so that roller 12 remains firmly against C-spring 15 or any linkage which is transmitting the input motion to movements 10.

Lever 29 is pivotally mounted by means of shaft 30 which is supported by ball bearings 31 and 32. The bearings in turn are mounted in support 33 which is slidably mounted upon brackets 34 and 57 extending from base 11. Support 33 is held in position against brackets 34 and 57 by means of screws 35 and 58.

The means of coupling the motion of input rod 14 to lever 29 is pin 20 in contact with lever extension 36 which actually forms a lever arm of lever 29. The downward biasing of input rod 14 by means of tension spring 27 causes pin 20 to bear upon lever extension 36 so as to rotate lever 29 in a counter-clockwise direction as viewed in FIG. 1.

At the upper portion of movement 10, there is located output rod 37 which is mounted for rectilinear motion with respect to base 11 by means of sleeves 38 and 39. The sleeves are mounted in supports 40 and 41 extending from base 11. Slides 42a and 42b are mounted upon supports 40 and 41 and are spaced apart in order to serve as a guide for bearing 43 mounted on arm 44 which extends at substantially right angles to output rod 37. The engagement of bearing 43 between the slides prevents rotation of output rod 37 about its own axis. Disc 45 mounted upon arm 44 of output rod 37 serves as the means for transmitting the motion of lever extension 46 mounted in lever 29 by means of set screw 47.

At one end of output rod 37 there is attached clamp 48 which is locked in place about the rod by means of screw 49. Mounted on clamp 48 is spring support 50 which retains one end of tension spring 51. The opposite end of tension spring 51 is held by spring support 52 attached to lever extension 46. Tension spring 51 biases lever extension 46 to cause it to remain in contact with disc 45 at all times. This biasing function is demonstrated by the schematic representation in FIG. 5. Thus it may be seen that the force of tension spring 51 urges the free end of lever 29 in the direction of spring support 50 extending from clamp 48. The force of spring 51 tends to move lever 29 about disc 45 which is effectively a fulcrum point and thus is shown as such in FIG. 5. The resulting moment caused by the action of spring 51 causes a net overall clockwise movement being applied to lever 29 pivoted upon shaft 30 which also is effectively a fulcrum point. Since output rod 37 is slidably mounted with respect to base 11, the system including lever 29, output rod 37, and clamp 48 move to the right as viewed until the rod reaches the limits of its rectilinear travel.

In order to insure smooth operation of lever 29 over its entire arcuate range, the lever is balanced about its axis of rotation along shaft 30 by means of balance weight 53 supported by shaft 54 extending from the lever. Shaft 54 may be threaded and provided with adjusting nuts 55 and 56 to retain the weight at any predetermined position.

In use the movement may be employed to magnify the small deflections of a sensing unit such as the C-spring of a scale so that a convenient output spring scale may be obtained. In employing a lever system it is obvious that by positioning the fulcrum between the input and output connections to the lever, various degrees of magnification of the output movement may be obtained. In analyzing a simple lever system, the assumption is made that the input and output motions are connected to the lever with point or contact, thereby eleminating errors over the range of operation of the lever system. Motion transmitting links employing needle-like pivots or sharp knife-edges engaging the lever bar are disadvantageous from the standpoint of wear, difficulty of manufacture and lack of strength.

In my device, input rod 14 and output rod 37 are connected to the lever 29 of the system by means of circular or cylindrical motion coupling means, namely pin 20 and disc 45. The mere use of a circular element to eliminate the above stated problems is not an adequate solution since the point of contact of a cylindrical unit with respect to the plane surface of the lever introduces a distortion or error in the relationship of the output motion with respect to the input motion. I have discovered, however, that by relating the diameters of the circular or cylindrical motion coupling means to the lengths of their respective lever arms, that is the distance from the fulcrum of the lever to the point of contact of the coupling means on the lever, it is possible to virtually eliminate errors due to the cylindrical form of such coupling means. The solution then may be stated to be that of dimensioning the motion coupling means so that their diameters are related to one another in the same ratio as their respective lever arms are related to one another.

In view of these principles, the diameter of pin 20 is related to the diameter of disc 45 in the same ratio as the lever arm or the length of lever extension 36 is related to the active length of lever extension 46, both being measured from the axis of rotation of shaft 30.

In this way the movement of the point of contact between pin 20 and lever extension 36 exactly compensates for the movement in the point of contact of disc 45 and lever extension 46. In determining the length of the lever arms for computing the diameters of the pin and disc, the system must be positioned such that the lever arm is at right angles to the line of movement of the particular rod and that the planes of contact between the lever and the rods, namely the surface of extension 36 or 46, pass through the axis of rotation of lever 29. The planes of contact are designated A—A and B—B in FIG. 4.

In order to calibrate movement 10 so that there is an exact correspondence between the output motion for a given input motion, it is necessary to adjust the length of the lever arm determined by lever extension 36 with respect to pin 20. Lever 29 is held by support 33 mounted on brackets 34 and 57. Support 33 is secured against brackets 34 and 57 by means of screws 35 and 58 respectively. By loosening screws 35 and 58, jack screws 59 and 60 may be operated to move the axis of rotation of lever 29 toward or away from pin 20 thereby performing the required calibration adjustments.

The motion of output rod 37 is transmitted through clamp 48 and screw 61 to rack 62 engaged with pinion 63. Pinion 63 is mounted upon shaft 64 which is supported within bushing 65 mounted in base 11. The outer end of shaft 64 may be provided with pointer 66 or a connection to indicating linkage. Stop 67 mounted on base 11 is adjacent the upper side of rack 62 and serves to prevent the disengagement of rack from pinion 63 whenever a sudden movement of the rack occurs.

The terms and expressions which I have employed are uesd in a descriptive and not a limiting sense and there is no intention of excluding such equivalents of the invention described or of portions thereof as fall within the purview of the claims.

What is claimed is:

1. A movement for converting an input rectilinear motion into an output rectilinear motion which is a multiple of the input motion including a base, a lever pivotally mounted on said base, said lever having lever arms extending from the pivotal mounting, an input rod adjacent one of said lever arms and mounted on said base for rectilinear motion, an output rod adjacent the other of said lever arms and mounted on said base for rectilinear motion, means for coupling each of said rods to the lever arm adjacent thereto, each of said coupling means having a circular portion for engaging each of said rods with the lever arm adjacent thereto, the axis of the center of curvature of said circular portion extending parallel to the axis of rotation of said pivotally mounted lever, the radii of the circular portions of the coupling means being related to one another as the effective lengths of their respective lever arms are related, the effective lengths of each of said lever arms being the distance from said axis of rotation to the line of motion of the rod adjacent thereto, whereby said lever multiplies the input motion into an output motion by the ratio of the effective lengths of the lever arms.

2. A movement in accordance with claim 2 in which each of said lever arms includes a substantially cylindrical member extending adjacent to a different one of said rods, a surface portion of each of said cylindrical members being in contact with a different one of said coupling means.

3. A movement in accordance with claim 2 in which means for coupling each of said rods to the lever arm adjacent thereto includes a disc member attached to each of said rods, said disc members each having a cylindrical portion contacting the lever arm adjacent thereto.

4. A movement for converting an input rectilinear motion into an output rectilinear motion being a multiple thereof including a base, a lever pivotally mounted on said base, said lever having lever arms extending from the pivotal mounting, an input rod adjacent one of said lever arms and mounted on said base for rectilinear motion, an output rod adjacent the other of said lever arms and mounted on said base for rectilinear motion, means for coupling each of said rods to the lever arm adjacent thereto, each of said coupling means having a circular portion for engaging each of said rods with the lever arm adjacent, the axis of the center of curvature of said circular portion extending parallel to the axis of rotation of said pivotally mounted lever, the radii of the circular portions of the coupling means being related to one another as the effective lengths of their respective lever arms are related, the effective lengths of each of said lever arms being the distance from said axis of rotation to the line of motion of the rod adjacent thereto, means for biasing one of said lever arms to urge said lever in one direction of rotation, and means for biasing the other of said lever arms to urge said lever in the other direction of rotation, whereby said lever multiplies the input motion into an output motion by the ratio of the effective lengths of the lever arms.

5. A movement in accordance with claim 4 in which each of said lever arms includes a substantially cylindrical member extending adjacent to a different one of said rods, a surface portion of each of said cylindrical members being in contact with a different one of said coupling means.

6. A movement in accordance with claim 4 in which said means for coupling each of said rods to the lever arm adjacent thereto includes a disc member attached to each of said rods, said disc members each having a cylindrical portion contacting the lever arm adjacent thereto.

7. A movement in accordance with claim 4 in which said means for biasing one of said lever arms includes spring means disposed between the rod adjacent to said one lever arm and said base, said spring means biasing said rod in a predetermined direction, the biasing of said rod being transmitted to said one lever arm by said coupling means in contact therewith, and in which said means for biasing the other of said lever means includes additional spring means disposed between said other lever arms and the rod adjacent thereto, said additional spring means biasing said other lever arm in a direction of rotation opposite to that of the biasing of said one lever means, whereby said coupling means are maintained in contact with said lever arms.

8. A movement for converting an input rectilinear motion into an output rectilinear motion being a multiple thereof including a base, a lever, means for pivotally mounting said lever on said base, said lever having lever arms extending from the pivotal mounting, an input rod adjacent one of said lever arms and mounted on said base for rectilinear motion, an output rod adjacent the other of said lever arms and mounted on said base for rectilinear motion, means for coupling each of said rods to the lever arm adjacent thereto, each of said coupling means having a circular portion for engaging each of said rods with the lever arm adjacent to said rod, the axis of the center of curvature of said circular portion extending parallel to the axis of rotation of said pivotally mounted lever, the radii of the circular portions of the coupling means being related to one another as the effective lengths of their respective lever arms are related, the effective lengths of each of said lever arms being the distance from said axis of rotation to the line of motion of the rod adjacent thereto, and means for positioning said pivotal mounting means in a direction at right angles to the line of motion of one of said rods to adjust the effective length of the lever arm adjacent thereto, whereby said lever multiplies the input motion into an output motion by the ratio of the effective lengths of the lever arms.

9. A movement for converting an input rectilinear motion into an output circular motion being a multiple thereof including a base, a lever pivotally mounted on said base, said lever having lever arms extending from the pivotal mounting, an input rod adjacent one of said lever arms and mounted on said base for rectilinear motion, an output rod adjacent the other of said lever arms and mounted on said base for rectilinear motion, means for coupling each of said rods to the lever arm adjacent thereto, each of said coupling means having a circular portion for engaging each of said rods to the lever arm adjacent thereto, each of said coupling means having a circular portion for engaging each of said rods with the lever arm adjacent thereto, the axis of the center of curvature of said circular portion extending parallel to the axis of rotation of said pivotally mounted lever, the radii of the circular portions of the coupling means being related to one another as the effective lengths of their respective lever arms are related, the effective length of each of said lever arms being the distance from said axis of rotation to the line of motion of the rod adjacent thereto, and means connected to said output rod for converting the rectilinear motion of said output rod into circular motion, whereby said lever multiplies the input motion into an output motion by the ratio of the effective lengths of the lever arms.

10. A movement in accordance with claim 9 in which means for converting the rectilinear motion of said output rod into circular motion includes a rack connected to said output rod and a pinion engaged and driven by said rack.

11. A movement for converting an input rectilinear motion into an output circular motion being a multiple thereof including a base, a lever pivotally mounted on said base, said lever having lever arms extending from the pivotal mounting, an input rod adjacent one of said lever arms and mounted on said base for rectilinear motion, and an output rod adjacent the other of said lever arms and mounted on said base for rectilinear motion, means for coupling each of said rods to the lever arm adjacent thereto, each of said coupling means having a circular portion for engaging each of said rods with the lever arm adjacent thereto, the axis of the center of curvature of said circular portion extending parallel to the axis of rotation of said pivotally mounted lever, means for biasing one of said lever arms to urge said lever in one direction of rotation, and means for biasing the other of said lever arms to urge said lever in the other direction of rotation, and means connected to said output rod for converting the rectilinear motion of said output rod into circular motion, whereby said lever multiplies the input motion into an output motion by the ratio of the effective lengths of the lever arms.

References Cited in the file of this patent

UNITED STATES PATENTS

| | | |
|---|---|---|
| 2,350,002 | Van Sittert et al. | May 30, 1944 |
| 2,657,585 | Williams et al. | Nov. 3, 1953 |
| 2,667,788 | May et al. | Feb. 2, 1954 |

UNITED STATES PATENT OFFICE
CERTIFICATE OF CORRECTION

Patent No. 3,081,640 March 19, 1963

John F. Chatillon

It is hereby certified that error appears in the above numbered patent requiring correction and that the said Letters Patent should read as corrected below.

Column 4, line 61 and 67, for the claim reference numeral "2", each occurrence, read -- 1 --.

Signed and sealed this 21st day of January 1964.

(SEAL)
Attest:
ERNEST W. SWIDER

Attesting Officer

EDWIN L. REYNOLDS

Acting Commissioner of Patents